United States Patent Office 3,095,281
Patented June 25, 1963

3,095,281
PROCESS FOR THE PREPARATION OF COMMON SALT BY THE EVAPORATION OF SOLUTIONS
Gerrit Schinkel, Hengelo, Netherlands, assignor to N.V. Koninklijke Nederlandsche Zoutindustrie, Hengelo, Netherlands, a limited-liability company of the Netherlands
No Drawing. Filed July 5, 1957, Ser. No. 669,920
Claims priority, application Netherlands July 6, 1956
2 Claims. (Cl. 23—300)

This invention relates to processes for the preparation of common salt.

During the technical preparation of common salt by the evaporation of solutions, a supersaturated solution is formed. This supersaturation is neutralized, on the one hand, by the formation of new crystals (formation of nuclei) and, on the other hand, by the growth of crystals present. The grain size of the product is determined by the ratio between the quantity of crystallized salt and the number of individuals, i.e. by the way in which the extent of the formation of nuclei and the rate of growth are affected by the manufacturing process and the construction of the equipment.

Since for some applications large grain sizes are desirable, many attempts have been made to prepare coarser salt. Usually radical changes were made in the existing equipment for this purpose. Attempts have further been made to attain this end without changes in the equipment, namely, by adding foreign substances to the solution to be evaporated. Thus, for example, it has been described in the British patent specification No. 617,137 that coarser salt can be obtained by the addition of slight amount of tetraalkylammonium salts or polyethylene-oxy compounds to the brine. The present invention also relates to a process of this kind.

In Patent No. 3,000,708 it has been described how the crystallization of common salt can be influenced by this addition of small amounts of compounds supplying nitrilotriacetate ions. In fact, when such ions are present during crystallization, coarser salt is obtained, which is considerably harder than normally produced salt, and during the preparation of the salt less incrustation of the evaporating equipment occurs. The addition of more than 30 mg. of the said compounds per litre appears to produce little further improvement, if any. On the other hand, a slight increase of the size of the crystals and a slightly greater hardness can be attained upon addition of a small amount of dimethylglyoxim. In this case, hardness is to be taken in the sense of the resistance to breakage under mechanical load.

According to the invention, all the said advantages of the addition of compounds supplying nitrilotriacetate ions can also be obtained in the presence of soluble salts of carboxymethyl cellulose.

Just as with derivatives of nitrilotriacetic acid, with the additive disclosed herein common salt crystals are obtained which are larger and harder than normally obtained crystals.

Thus, when salt has been obtained in a particular apparatus from brine without any addition, the average particle size is 1.8 mm., and the hardness is 0.48, while upon addition of 30 mg. of sodium nitrilotriacetate to 1 litre of brine under otherwise identical working conditions the average particle size becomes 2.17 mm. and the hardness 0.72. If, instead of the said compound, 30 mg. of sodium carboxymethyl cellulose per litre of brine are added, these figures become 2.3 mm. and 0.75 respectively. The hardness determinations are carried out in the same way as described in U.S. Patent No. 3,000,708 already referred to, namely, by subjecting the crystals for a predetermined time to disintegration in standardized manner in a ball mill. The ratio between the average particle sizes after and before the experiment is then a measure of the hardness.

A second point of resemblance consists in the fact that, just as with the use of compounds supplying nitrilotriacetate ions, in the presence of the said cellulose derivatives a reduction of the incrustation on the walls of the equipment is established, which results in better heat economy and longer use of the equipment without cleaning.

After the experiments described above, in which instead of compounds supplying nitrilotriacetate ions soluble salts of carboxymethyl cellulose were used, a number of experiments were carried out with brine to which a representative of each of the two groups of compounds had been added. It was found that no additional increase of the particle size indeed was caused by this combination, but that the salt thus obtained is considerably harder than salt in which only one of the said compounds has been used. Thus when salt was produced as in the above mentioned experiments, but with addition of 30 mg. of sodium nitrilotriacetate and 30 mg. of sodium carboxymethyl cellulose to 1 litre of the brine to be evaporated, the average particle size was found to be 2.1 mm. and the hardness 0.92, a figure which could not be attained by means of larger amounts of either one of the two additions alone.

Another advantage of the process is that the salt thus obtained, like so-called pan salt, is sharp to the touch.

It is known that the manufacture of pan salt, which is made by evaporating brine in open pans, is expensive owing to high fuel consumption. These high expenses, however, are offset by a few advantages, which are so important that many attempts have been made to initiate this pan salt by evaporation in equipment of different constructions. In some respects these attempts have been successful, e.g. as regards the average particle size. The property of pan salt which previously could not be imitated, however, is its sharpness, which is greatly desired by particular groups of consumers. It was precisely this sharpness which appeared to occur when salt was prepared by evaporation of salt solutions which contained the said soluble salts of carboxymethyl cellulose, while other products were or were not present at the same time.

In order to make possible a comparison of different samples of salt, a given quantity of salt was placed at the top of a slightly inclined plane, which was set in motion in a standardized manner. If in each experiment the quantity of salt, the inclination and the length of the plane, and the duration are equal, the portion of the salt which remains on the inclined plane is a measure of the sharpness, which is found to run parallel to subjective judgment by manual touch. In this way, the sharpness of salt prepared without any addition was found to be 0.6, while the sharpness of salt prepared under otherwise identical conditions, with 30 mg. of sodium carboxymethyl cellulose with or without 30 mg. of sodium nitrilotriacetate per litre of brine, was 0.9.

What is claimed is:

1. A process for the manufacture of sodium chloride in the form of hard and sharp grains comprising adding to a solution of sodium chloride a small proportion of a soluble salt of carboxymethyl cellulose and a compound supplying nitrilotriacetate ions and evaporating said solution in a closed evaporating device.

2. A process according to claim 1 comprising adding between 1 and 100 mg. of the soluble salt of carboxymethyl cellulose and between 1 and 100 mg. of the compound supplying nitrilotriacetate ions per litre.

(References on following page)

References Cited in the file of this patent

UNITED STATES PATENTS 2,642,335  May ------------------ June 16, 1953

FOREIGN PATENTS 498,284  Canada ---------------- Dec. 8, 1953

OTHER REFERENCES

White et al., Kolloid-Z, vol. 132, pp. 147–149, 1953 (August-September).

White, "Chem. Abst.," vol. 48, page 1763d, January-March 1954.